G. HUNZIKER.
Distilling Apparatus.
No. 136,921. Patented March 18, 1873.
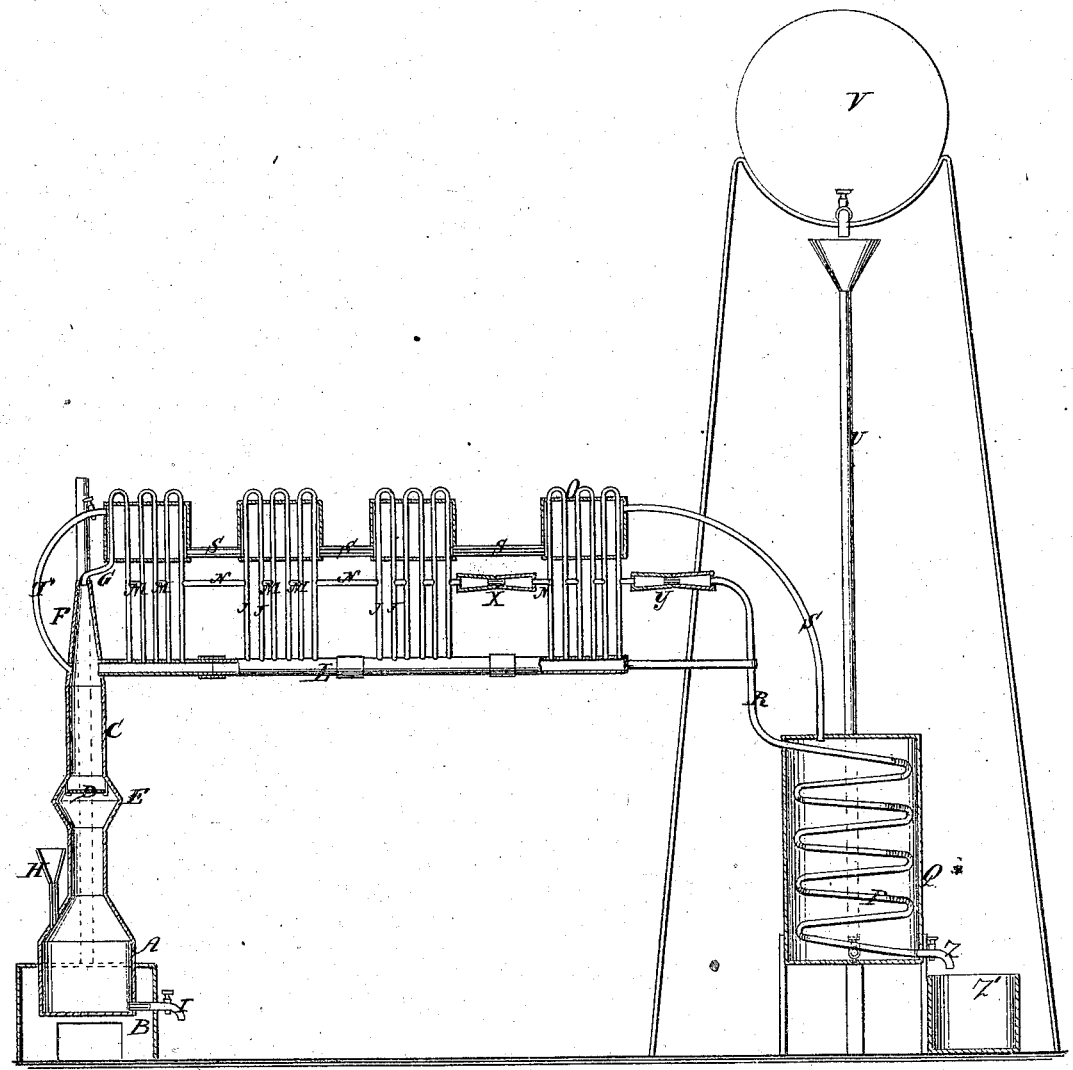
Witnesses:
E. Wolff
C. Sedgwick
Inventor:
G. Hunziker
per
Attorneys.

UNITED STATES PATENT OFFICE.

GASPAR HUNZIKER, OF SUMMIT, MISSISSIPPI.

IMPROVEMENT IN DISTILLING APPARATUS.

Specification forming part of Letters Patent No. 136,921, dated March 18, 1873.

*To all whom it may concern:*

Be it known that I, GASPAR HUNZIKER, of Summit, in the county of Pike and State of Mississippi, have invented a new and Improved Distilling Apparatus, of which the following is a specification:

The invention consists in the improvement of an ordinary distilling apparatus, as hereinafter fully described, and subsequently pointed out in the claim.

The drawing is a sectional elevation of my improved distilling apparatus.

A is the copper kettle for heating the liquor to be distilled; B, the furnace whereon it sits to be heated. C is a large high tube, rising up from the top, to provide considerable space for the vapors, and to hold a showering or sprinkling riddle, or other equivalent device, D, in an enlargement, E, of the said tube. F is a conical termination of the top of the tube, to which the pipe G leading to the condensers is connected. H is a funnel for pouring in water to be used at the beginning of the operation. I is a pipe for drawing off the spent mash. K is a pipe through which the liquor to be distilled flows from the condensers to the kettle through the tube C, to which it is admitted above the sprinkler.

The condensers consist of the vertical pipes J in pairs, connected by return bends at the top, connecting with the large horizontal return-pipe L at the lower ends, the pairs of vertical pipes being connected together at about the middle by the pipes M, and arranged in sections of about three pairs, together with pipe-connections N between each section, with the upper portions extending up into or through a barrel or cask, O, to each section, the first section being connected to the kettle by the pipe G, and the last section being connected with the final condensing-coil P, in the tank Q, by a pipe, R. These tanks of the sectional condenser are connected together by pipes S. The one next to the kettle is connected to it by a pipe, T, and the tank Q has a supply-pipe extending to an elevation considerably above the kettle, and the condensers to receive the liquor to be distilled from an elevated cistern or tank, V, high enough to force the liquor through the condensers, and into the kettle by the column in pipe U. X represents a rectifying-flask, introduced in the connecting-pipe N between the last two sections of the condenser; and Y is a flavoring-flask in the pipe R, from which the distilled liquor passes from the last section of the sectional condenser to the coil P in the tank Q.

To begin with, a small quantity of water is put in the kettle through the funnel H, to protect it from the heat, and generate steam for heating the apparatus up to the working condition. The cock in the reservoir V is then opened, and the liquor to be distilled is allowed to fill the tank Q and O, and, finally, flow into the kettle through the pipe T upon the sprinkler D, by which it is divided into fine particles so as to be heated to the best advantage by the vapors which it comes in contact with.

The vapors rise up through the pipe G into the condensing-pipe J within the tanks O; the condensing begins in the first section, and whatever is condensed flows down into the return-pipe L to return to the kettle for being redistilled, while the vapors continue to be acted on in the other sections to which they flow by the cooling medium, by which the separation of the heavy vapors and watery substances is continued, increasing the strength of the alcoholic vapors, as required, using more or less of the sectional condensers, which will have such pipe connections and cocks as may be needed to pass the vapors through the number required. At the same time, after the heavy vapors and watery substances are mainly separated, I propose to pass the volatile portions through rectifying and flavoring substances in the flasks X Y, or other equivalent contrivances, and thus save the necessity for special apparatus to pass the distilled liquor through these substances.

From the coil P, to which the distilled liquor finally flows from the sectional condensers, the rectifying and the flavoring apparatus, it is drawn off through the cock Z to any suitable receptacle, Z'.

Having thus described my invention, I claim as new and desire to secure by Letters Patent—

1. The tanks O and pipes J combined and arranged to form condensers, as described.

2. The combination, with the series of condensers J O, the therewith connected condenser Q P, and the straight pipe L, of the supply device U V, and the vaporizer A C, all arranged as and for the purpose described.

GASPAR HUNZIKER.

Witnesses:
W. W. MOORE,
C. APPEL.